US010496708B2

(12) United States Patent
Grossman et al.

(10) Patent No.: US 10,496,708 B2
(45) Date of Patent: *Dec. 3, 2019

(54) SYSTEM AND METHOD FOR INTERACTIVE VISUAL REPRESENTATION OF METADATA WITHIN A NETWORKED HETEROGENEOUS WORKFLOW ENVIRONMENT

(71) Applicant: World Software Corporation, Glen Rock, NJ (US)

(72) Inventors: Fred Grossman, Glen Rock, NJ (US); Ray Zwiefelhofer, Glen Rock, NJ (US)

(73) Assignee: World Software Corporation, Glen Rock, NJ (US)

( * ) Notice: Subject to any disclaimer, the term of this patent is extended or adjusted under 35 U.S.C. 154(b) by 328 days.

This patent is subject to a terminal disclaimer.

(21) Appl. No.: 15/610,240

(22) Filed: May 31, 2017

(65) Prior Publication Data

US 2017/0270116 A1 Sep. 21, 2017

Related U.S. Application Data

(63) Continuation of application No. 14/612,990, filed on Feb. 3, 2015, now Pat. No. 9,697,203.

(60) Provisional application No. 61/934,878, filed on Feb. 3, 2014.

(51) Int. Cl.
*G06F 16/93* (2019.01)
*G06Q 10/10* (2012.01)

(52) U.S. Cl.
CPC ............. *G06F 16/93* (2019.01); *G06Q 10/10* (2013.01); *G06Q 10/103* (2013.01)

(58) Field of Classification Search
CPC ....... G06F 16/93; G06Q 10/10; G06Q 10/103
USPC ......................................................... 707/608
See application file for complete search history.

(56) References Cited

U.S. PATENT DOCUMENTS

| 6,584,466 | B1 | 6/2003 | Serbinis et al. |
| 7,703,044 | B2 | 4/2010 | Graham |
| 7,788,592 | B2 | 8/2010 | Williams et al. |
| 8,051,406 | B2 | 11/2011 | Knight et al. |
| 8,566,701 | B2 * | 10/2013 | Ishizuka ............... G06F 16/258 715/234 |
| 2001/0037460 | A1 | 11/2001 | Porcari |
| 2003/0009345 | A1 | 1/2003 | Thorpe |

(Continued)

*Primary Examiner* — Evan Aspinwall
(74) *Attorney, Agent, or Firm* — Scott T. Griggs; Griggs Bergen LLP

(57) ABSTRACT

A system and method for interactive visual representation of metadata within a networked heterogeneous workflow environment is disclosed. In one embodiment of the system, a document management server is configured to provide an enterprise environment having storage, versioning, metadata, security, indexing, and retrieval of a multitude of files having various users. The document management server evaluates the metadata associated with the files based on user and frequency characteristics and creates frequently-used metadata associated with each user. Accessible with user login information at a multifunction document production device connected to the document management server, the frequently-used metadata enables a new electronic copy file produced by the multifunction document production device upon scanning of a hard copy file to include metadata populated by a user-initiated selection.

20 Claims, 6 Drawing Sheets

(56) References Cited

U.S. PATENT DOCUMENTS

| | | |
|---|---|---|
| 2005/0216838 A1 | 9/2005 | Graham |
| 2006/0010148 A1 | 1/2006 | Saltier et al. |
| 2006/0116994 A1 | 6/2006 | Jonker et al. |
| 2006/0156246 A1 | 7/2006 | Williams et al. |
| 2008/0235595 A1 | 9/2008 | Krantz et al. |
| 2009/0030948 A9 * | 1/2009 | Lipman .................. G06F 16/93 |
| 2011/0214090 A1 | 9/2011 | Yee et al. |
| 2015/0220522 A1 | 8/2015 | Grossman et al. |

* cited by examiner

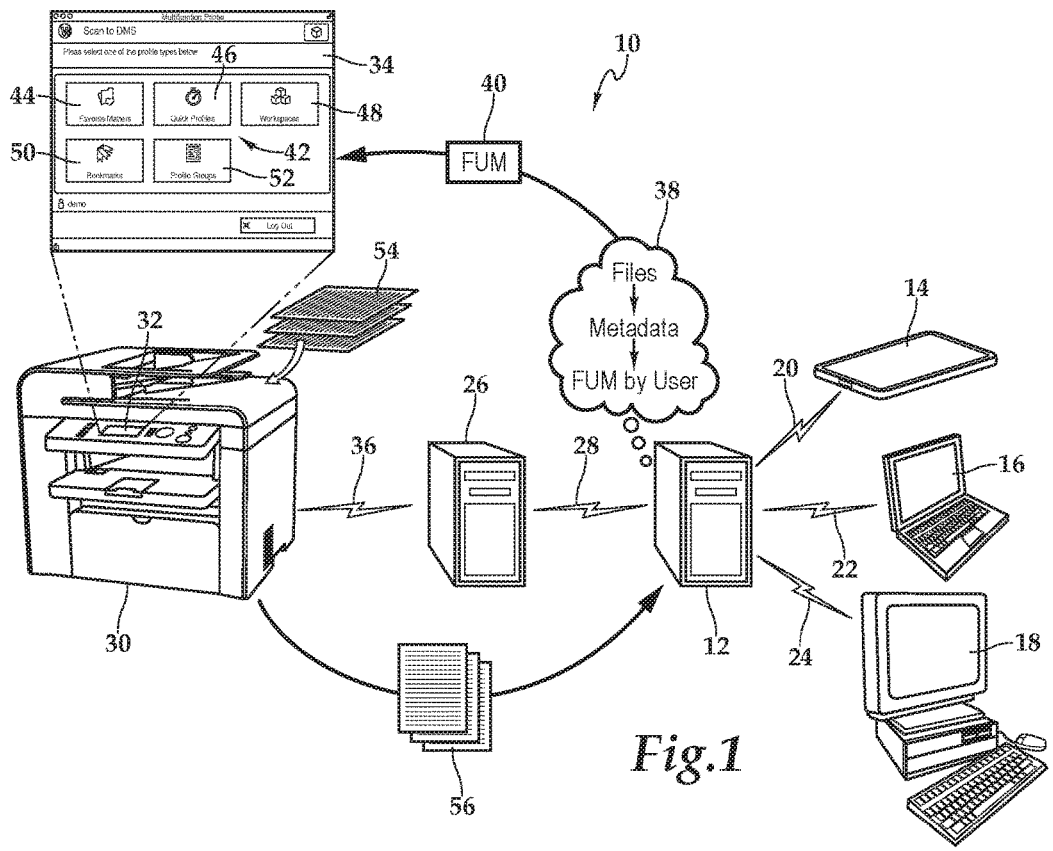
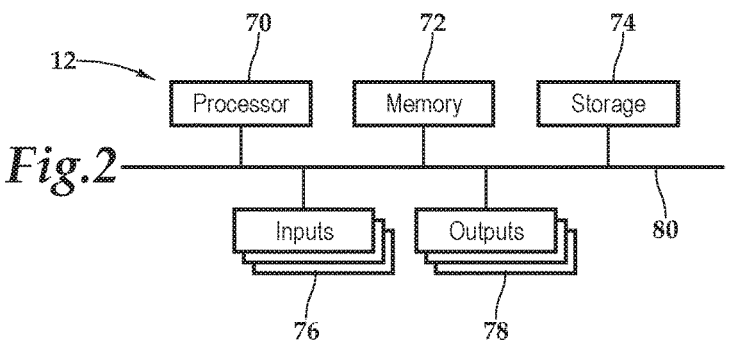
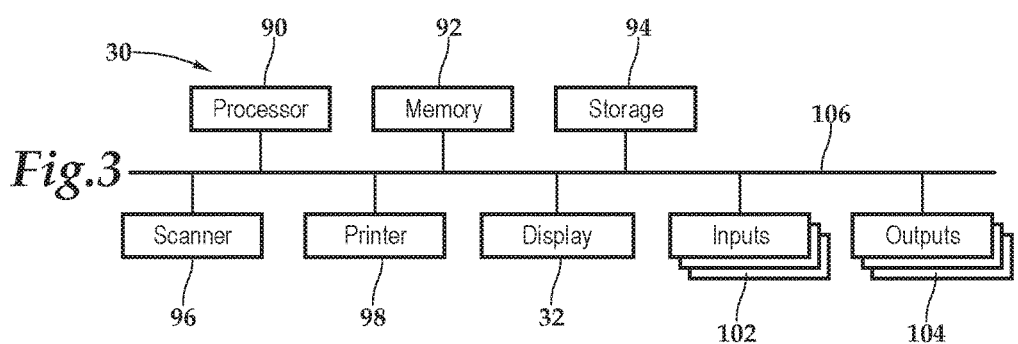

SYSTEM AND METHOD FOR INTERACTIVE VISUAL REPRESENTATION OF METADATA WITHIN A NETWORKED HETEROGENEOUS WORKFLOW ENVIRONMENT

PRIORITY STATEMENT

This application is a continuation of co-pending U.S. patent application Ser. No. 14/612,990 entitled "System and Method for Interactive Visual Representation of Metadata within a Networked Heterogeneous Workflow Environment" and filed on Feb. 3, 2015 in the names of Fred Grossman et al.; which claims priority from U.S. Patent Application Ser. No. 61/934,878 entitled "System and Method for Interactive Visual Representation of Metadata within a Networked Heterogeneous Workflow Environment" and filed on Feb. 3, 2014 in the names of Fred Grossman and Ray Zwiefelhofer; both of which are hereby incorporated by reference for all purposes.

TECHNICAL FIELD OF THE INVENTION

This invention relates, in general, to the management and use of metadata that may be generated by software application systems and, in particular, to systems and methods for interactive visual representation of metadata within a networked heterogeneous workflow environment.

BACKGROUND OF THE INVENTION

Metadata is commonly used in various information technology (IT) systems to describe the informational content of various files and may include, for example, the name of a file, file type, or the name and length of particular data items. As a result, metadata may be employed to efficiently manage data leading to more convenience, efficiency, and productivity. Advances in computer software and techniques, however, are required to fully use metadata within networked heterogeneous workflow environments, including both software applications and document production equipment such as multifunction printers and copiers.

SUMMARY OF THE INVENTION

It would be advantageous to fully utilize metadata within networked heterogeneous workflow environments. It would also be desirable to enable a computer-based solution that would improve document management efficiency and effectiveness when using document production equipment such as multifunction printers and copiers. To better address one or more of these concerns, a system and method for interactive visual representation of metadata within a networked heterogeneous workflow environment are disclosed.

In one embodiment of the system, a document management system (DMS) server is configured to provide an enterprise environment having a document management system furnishing storage, versioning, metadata, security, indexing, and retrieval of a multitude of files having various users. The document management server evaluates the metadata associated with the files based on user and frequency characteristics and creates frequently-used metadata associated with each user. Accessible with user login information at a multifunction document production device connected to the document management server, the frequently-used metadata enables a new electronic copy file produced by the multifunction document production device upon scanning of a hard copy file to include metadata populated by a user-initiated selection. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic block diagram depicting one embodiment of a system for interactive visual representation of metadata within a networked heterogeneous workflow environment;

FIG. 2 is a schematic block diagram depicting one embodiment of a document management system (DMS) server shown in FIG. 1 in further detail;

FIG. 3 is a schematic block diagram depicting one embodiment of a multifunction printer (MFP) shown in FIG. 1 in further detail;

DETAILED DESCRIPTION OF THE INVENTION

Figure 4:
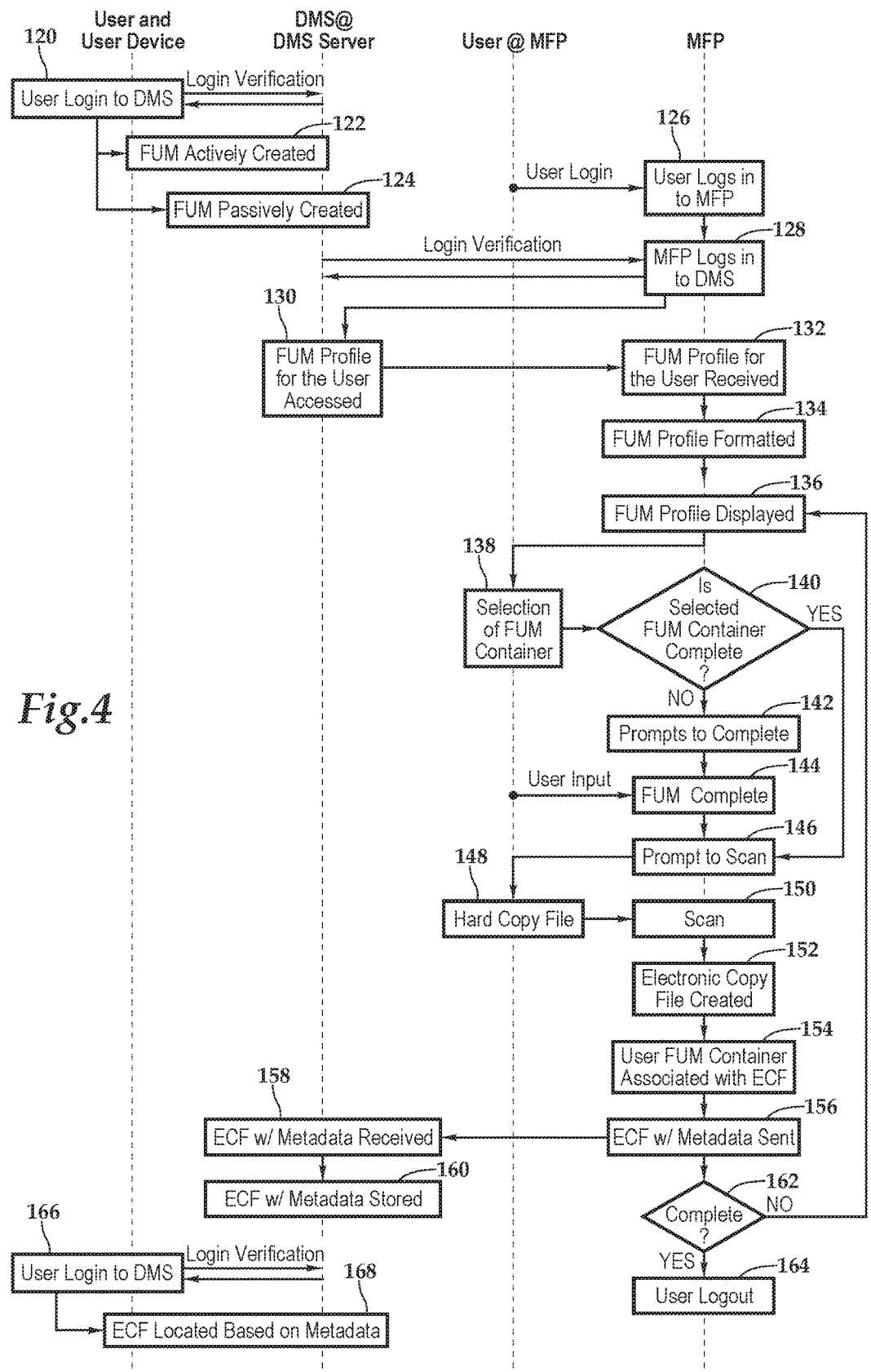
FIG. 4 is a diagrammatic representation of one embodiment of a workflow for executing a method for interactive visual representation of metadata within a networked heterogeneous workflow environment.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, therein is depicted one embodiment of a system for interactive visual representation of metadata within a networked heterogeneous workflow environment that is schematically illustrated and designated 10. A document management system (DMS) server 12 and multiple workflow computing devices, including a tablet computer 14, a laptop 16, and a desktop computer, for example, are connected thereto via respective communication links 20, 22, 24, which may include networks such as the Internet or intranet may be used.

As shown, the DMS server 12 stores the documents and document information created by various users utilizing the workflow computing devices 14, 16, 18. Moreover, the document information stored in the DMS server 12 may be accessed from the respective workflow devices, including a web server 26, which is connected to the DMS server 12 by a communication link 28. A workflow multifunction document production device 30, such as a multifunction printer (MFP) having scanning capability, including an interactive panel display 32 having a graphical user interface 34 is connected to the DMS server 12 by a communication link 36.

The DMS server 12 may include a document management system 38 that tracks and stores files. More particularly, the document management system 38 may provide storage, versioning, metadata, security, indexing, and retrieval capabilities. Storage may include management and document management functions such as where the files are stored, for how long, migration (if necessary) from one storage media to another, and eventual document destruction. Versioning may include managing a process by which documents are checked in or out of the document management system 38, allowing users to retrieve previous versions, or work from a selected point in time or place in the document. Security may include various file permissions and passwords, for example. Indexing may include tracking the files with unique document identifies and other techniques that support the file's rapid retrieval, which includes locating and opening the file.

In one exemplary embodiment, the document information stored in the DMS server 12 includes various metadata, which may include the date the document was stored and various identifying characteristics such as creator and subsequent modifiers. The metadata may also include information about the contents and context of a file as well as information related to the indexing and other document management system 38 functions. For example, when document information and metadata is created by the respective workflow computing devices 14, 16, 18 and uploaded on the DMS server 12, in the present embodiment, by user, the most frequently used metadata (FUM) is identified based on frequency characteristics such as favorites, quick profiles, bookmarks, and workspaces, for example. By way of extensible software protocol that communicates with a third-party device, such as the workflow multifunction document production device 30, the DMS server 12, in response to a user login at the workflow multifunction document production device 30, provides the FUM 40. The FUM 40, in turn, is displayed on the graphical user interface 34 of the display 32 in a profile type presentation 42.

The user navigates the profile type presentation 42 and selects the appropriate metadata container, such as favorite matters 44, quick profiles 46, workspaces 48, bookmarks 50, and profile groups 50. The favorite matters container may include folders that have been most recently visited by the user. The quick profiles 46 container may include previous one click saves by the user. The workspace 48 container may include folders that are matter-centric to the user. The bookmarks 50 container may include matter locations saved by the user. The profile groups 52 container may include lists of all the profile groups that the user has permission to access.

That is, a quickly accessible and interactive visual representation of the metadata in the FUM 40 is created, which may be in the form of a shortcut or icon logic tree that is associated with the login information of the user at the workflow multifunction document production device 30 by way of the DMS server 12. Thereafter, when a user log-ins to the workflow multifunction document production device 30 via the display panel 32 to scan a hard copy file 54, the user may select the appropriate metadata for the file about to be produced, electronic copy file 56, from the interactive visual representation or shortcut. Once selected, the metadata and document information for the newly produced file 56 is populated with the data associated with the interactive visual representation of the FUM 40 and appropriately stored at the DMS server 12. As a result, metadata may be employed to efficiently manage data leading to more convenience, efficiency, and productivity when scanning and saving documents.

Referring now to FIG. 2, a schematic block diagram is illustrated depicting the DMS server 12 in further detail. A computing device, which may be the DMS server or web server, for example, includes a processor 70, memory 72, storage 74, inputs 76, and outputs 78 interconnected with various buses 80 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 70 may process instructions for execution within the computing device, including instructions stored in the memory 72 or in the storage 74. The memory 72 stores information within the computing device. In one implementation, the memory 72 is a volatile memory unit or units. In another implementation, the memory is a non-volatile memory unit or units. The storage 74 provides capacity that is capable of providing mass storage for the computing device. Various inputs 76 and outputs 78 provide connections to and from the computing device, wherein the inputs 76 are the signals or data received by the computing device, and the outputs 78 are the signals or data sent from the computing device. As mentioned, the inputs 76 and the outputs 78 may include the various communication links 20, 22, 24, 28.

As discussed, the memory 72 is accessible to the processor 70 and the memory 72 includes processor-executable instructions that, when executed, cause the processor 72 to evaluate the metadata associated with the multiple files associated with the DMS server based on user and frequency characteristics and then, create, based on the evaluation, frequently-used metadata associated with each user. Further, the instructions cause the processor 72 to create for each user a multifunction document production device accessible interactive visual representation of the frequently-used metadata associated therewith. The multifunction document production device accessible interactive visual representation of the frequently-used metadata may be visually presented in a profile type presentation on the graphical user interface of the multifunction document production device via an extensible software protocol. In this implementation, the profile type presentation includes multiple quick access containers selected from the group consisting of favorite matters, quick profiles, workspaces, bookmarks, and profile groups, as discussed above.

The instructions also cause the processor to receive a user login request originated by a user at the multifunction document production device and responsive thereto, transmit the multifunction document production device accessible interactive visual representation of the frequently-used metadata associated with the user corresponding to the user login request. Thereafter, the instructions cause the processor to receive an electronic copy file with populated metadata, wherein the populated metadata is a subset of the frequently-used metadata associated with the user login request. By way of the instructions, the electronic file copy is stored at the document management server based on the metadata such that the electronic file copy is indexed and retrievable. In one embodiment, each of the multifunction document production device accessible interactive visual representations is accessible with user login information at the multifunction document production device such that a new electronic copy file produced by the multifunction document production device upon scanning of a hard copy file includes metadata that is populated by a user-initiated selection within an interactive visual representation associated with the multifunction document production device accessible interactive visual representation of the frequently-used metadata. It should be appreciated that although a particular architecture is presented in FIG. 2, the teachings presented herein include other architectures of DMS servers as well.

Referring now to FIG. 3, a schematic block diagram is illustrated depicting the workflow multifunction document production device 30 in further detail. The workflow multifunction document production device 30 includes a processor 90, memory 92, storage 94, scanner 96, printer 98, the display panel 32, inputs 102, and outputs 104 interconnected with various buses 106 in a common or distributed, for example, mounting architecture. The processor 90 may process instructions for execution within the workflow multifunction document production device 30, including instructions stored in the memory 92 or in the storage 94. The memory 92 stores information within the workflow multifunction document production device 30. In one implementation, the memory 92 is a volatile memory unit or units. In another implementation, the memory is a non-volatile memory unit or units. The storage 94 provides capacity that is capable of providing mass storage for the workflow multifunction document production device 30. The scanner 96 digitizes an image. The printer 98 creates a human-readable version of text and/or images on paper or a similar medium. The display panel 32 presents the graphical user interface 34. Various inputs 102 and outputs 104 provide connections to and from the workflow multifunction document production device (30), wherein the inputs 102 are the signals or data received by the workflow multifunction document production device (30), and the outputs 104 are the signals or data sent from the workflow multifunction document production device (30). As mentioned, the inputs 102 and the outputs 104 may include the communication link 36.

As discussed, the memory 92 is accessible to the processor 90 and the memory 92 includes processor-executable instructions that, when executed, cause the processor 92 to prompt login information at the graphical user interface and receive the login information at the graphical user interface. Thereafter, the instructions cause the processor to transmit the user login information to the multifunction document production device 30 and receive the multifunction document production device 30 accessible interactive visual representation from the multifunction document production device 30. The instructions cause the processor 90 to format the multifunction document production device 30 accessible interactive visual representation to an interactive visual representation with the profile type presentation displayed as a graphical user interface on the display panel.

Thereafter the processor 90 is caused by the instructions to prompt user selection within the profile type presentation at the graphical user interface and receive the user selection within the profile type presentation at the graphical user interface. Other functions that follow include scanning a hard copy file and creating a new electronic copy file based on the hard copy file. The instructions cause the processor to populate the new electronic copy file with metadata corresponding to the user selection, and transmit the electronic copy file with populated metadata to the multifunction document production device 30. It should be appreciated that although a particular architecture is presented in FIG. 3, the teachings presented herein include other workflow document product device architectures as well.

Referring now to FIG. 4, in one embodiment of a workflow for interactive visual representation of metadata within a networked heterogeneous workflow environment, the methodology involves multiple steps. At block 120, the user logins to the document management system and the login is verified at the document management system at the DMS server. The FUM may be actively created at block 122 where the user designates a portion or all of the FUM. This may involve saving a file and assigning complete metadata or heuristic favorites. Alternatively, at block 124 the FUM may be passively created by the DMS evaluating the metadata associated with the files on a user-by-user basis to identify frequency of use and other characteristics.

At block 126, the user logs into the workflow multifunction document production device 30, which is shown as a multifunction printer (MFP). The user login may be accomplished by entering user name and password, swiping an ID card or using a biometric identifier. At block 128, the MFP logs into the DMS and the login is verified. Thereafter, at block 130, the DMS server accesses the user's FUM and transmits the FUM to the MFP, where it is received at block 132. In one embodiment, the interactive visual representation associated with the multifunction document production device 30 is substantially equivalent, on a user-by-user basis, to a creative/editing interactive visual representation presented by the document management system on the computing devices. This improves the efficiency of the user experience of the computing devices and the workflow multifunction document production device. At block 134, the FUM is formatted as a list of metadata containers for display on the MFP panel at block 136. At block 138, the user selects the desired metadata container. At decision block 140, if the metadata is incomplete, then at block 142 prompts are generated and at block 144 with user input the FUM is complete prior to advancing to block 146. Returning to decision block 140, if the metadata containers are complete, then the process advances to block 146 where the user is prompted to scan a hard copy file, which is scanned at blocks 148 and 150 prior to the MFP creating an electronic file copy at block 152.

At block 154, the user metadata container is associated with the electronic file copy and the electronic file copy is sent to the DMS server at block 156 with the metadata, where it is received by the DMS server at block 158 and appropriately stored with the metadata at block 160. At decision block 162 if the user is done, then the user logs out of the MFP at block 164. Otherwise, the methodology returns to block 136. At 166, the user may login into the document management system and locate the electronic file copy based on the metadata at block 168.

Figure 5A:
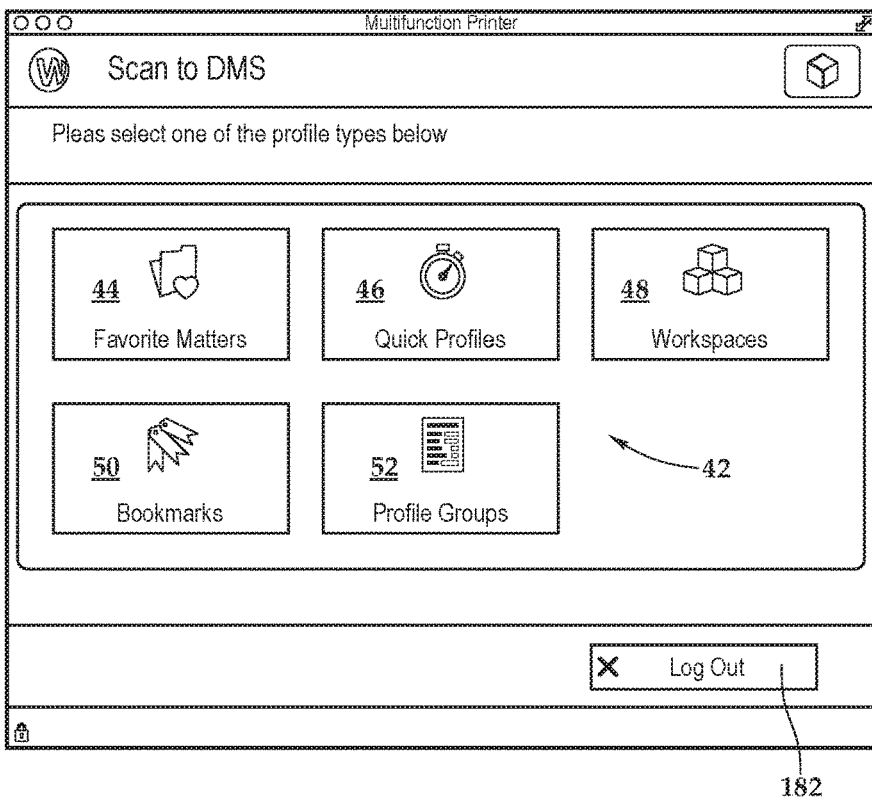
FIG. 5A through FIG. 5G are exemplary screenshots from an interface of the MFP of one embodiment of the interactive visual representation of metadata being utilized with a hardcopy file being scanned and saved from the MFP to the DMS.

Referring now to FIG. 5A through FIG. 5G, which as mentioned, are exemplary screenshots from an interface of the MFP of one embodiment of the interactive visual representation of metadata being utilized with a hardcopy file being scanned and saved from the MFP to the DMS. More specifically, FIG. 5A depicts a home screen 180 which is shown on the graphical user interface of the display panel of the workflow multifunction document production device 30 following a successful login by the user. As previously discussed, the user may be presented with options on the workflow multifunction document production device 30 that mirror the document management system experience on a workflow computing device. As shown, the profile type presentation 42 includes favorite matters 44, quick profiles 46, workspaces 48, bookmarks 50, and profile groups 52. A logout button 182 is also present.

Figure 5B:
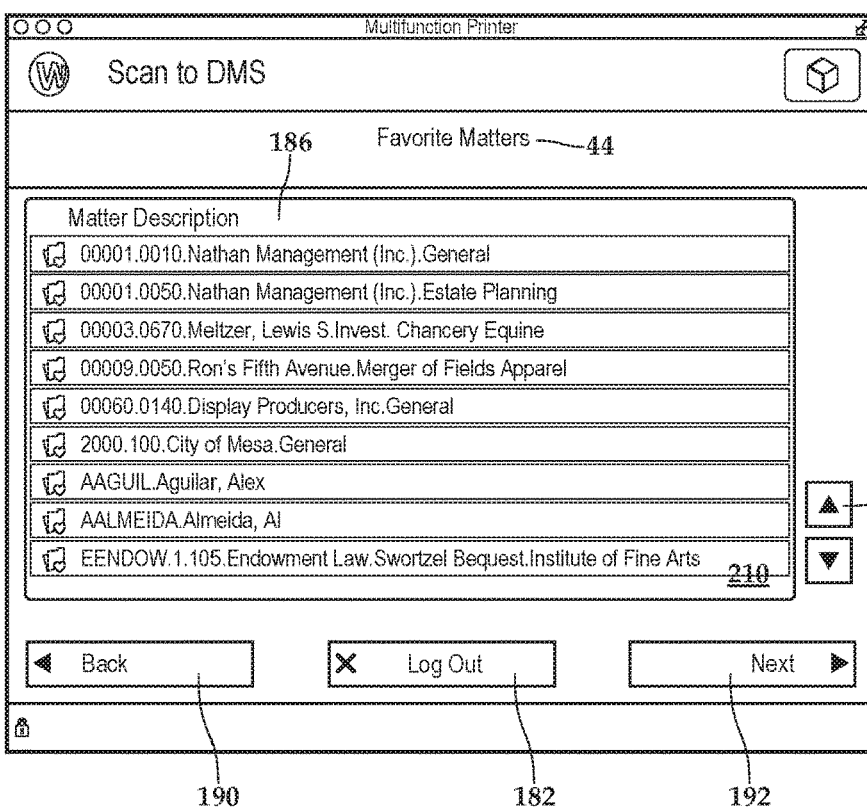
Figure 5C:
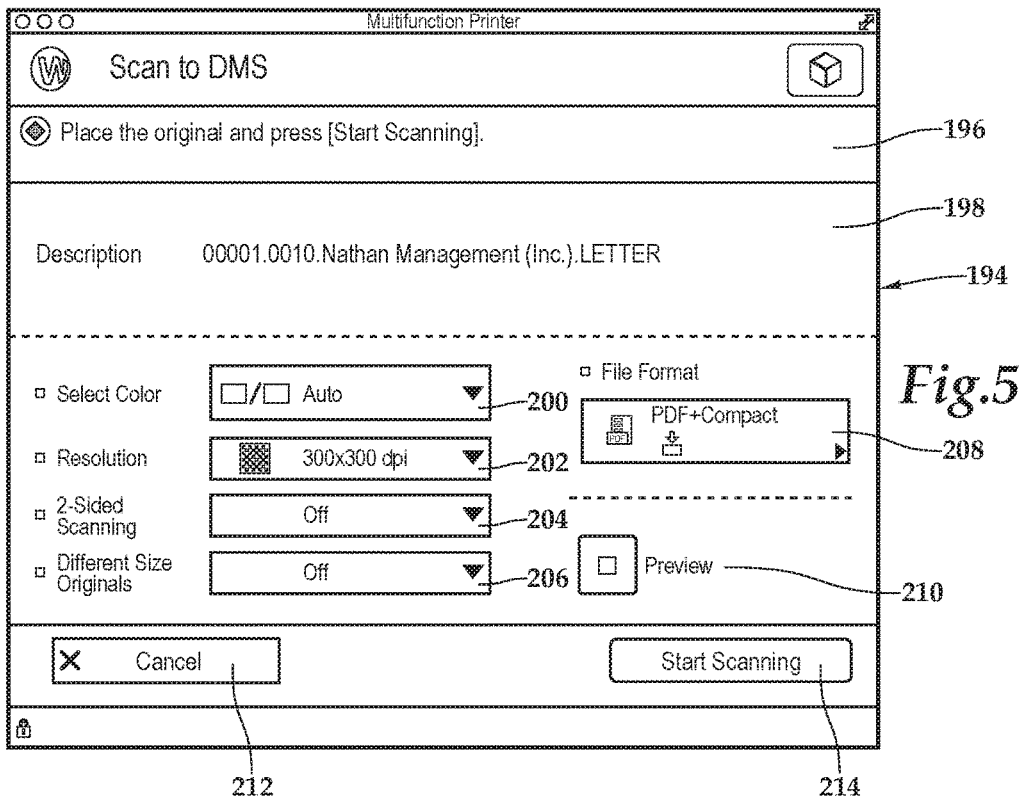

Referring now to FIG. 5B, wherein the user selected favorite matters 44 and the favorite matters screen 184 includes a file tree 186 with navigation buttons 188. The user may use the navigation buttons 188 to select the favorite matter from the file tree 186. A back button 190, logout button 182, and next button 192 are also presented. Referring now to FIG. 5C, following selection by the user of the favorite matter, at scanning option screen 194, the user is presented with instructions 196, a description of the favorite matter selected 198 and various scanning options 200, 202, 204, 206. A file format may also be selected at 208 and a preview option is presented at button 210. A cancel button 212 and start scanning button 214 are also presented.

Figure 5D:
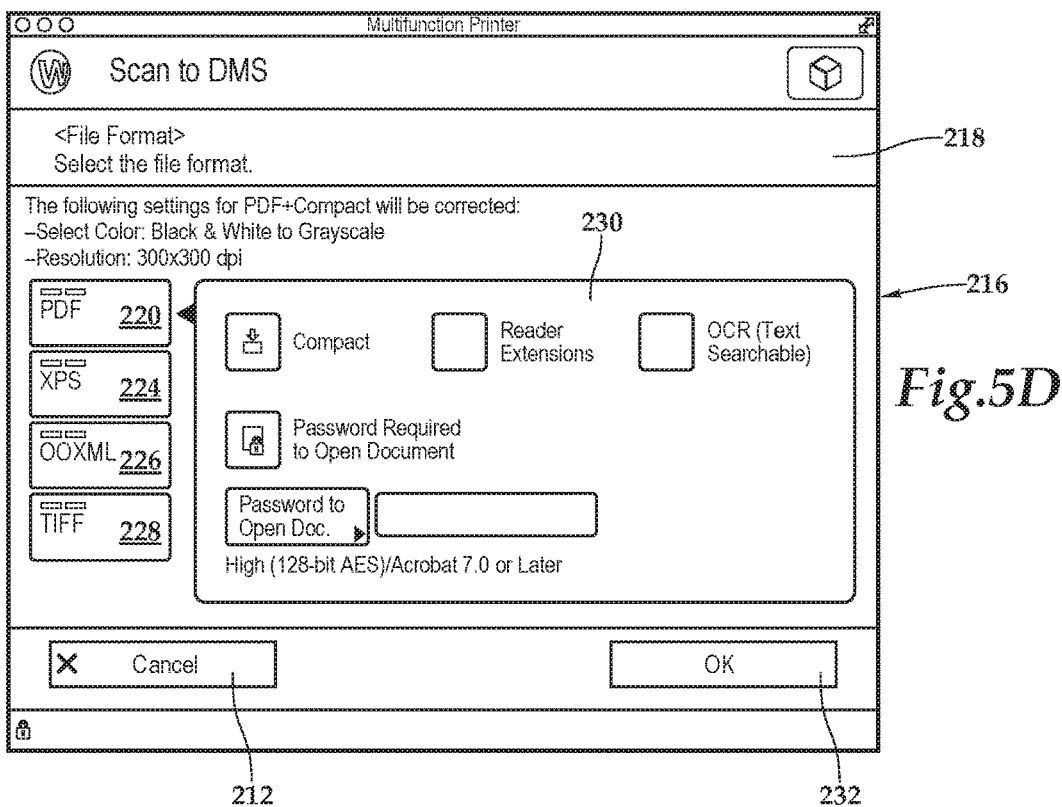
Figure 5E:
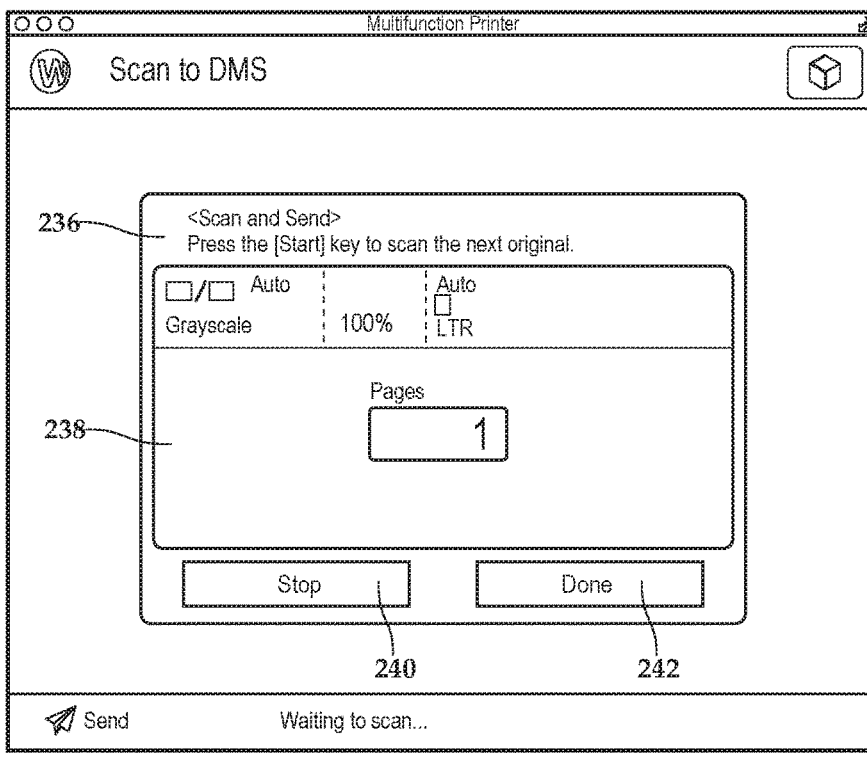
Figure 5F:
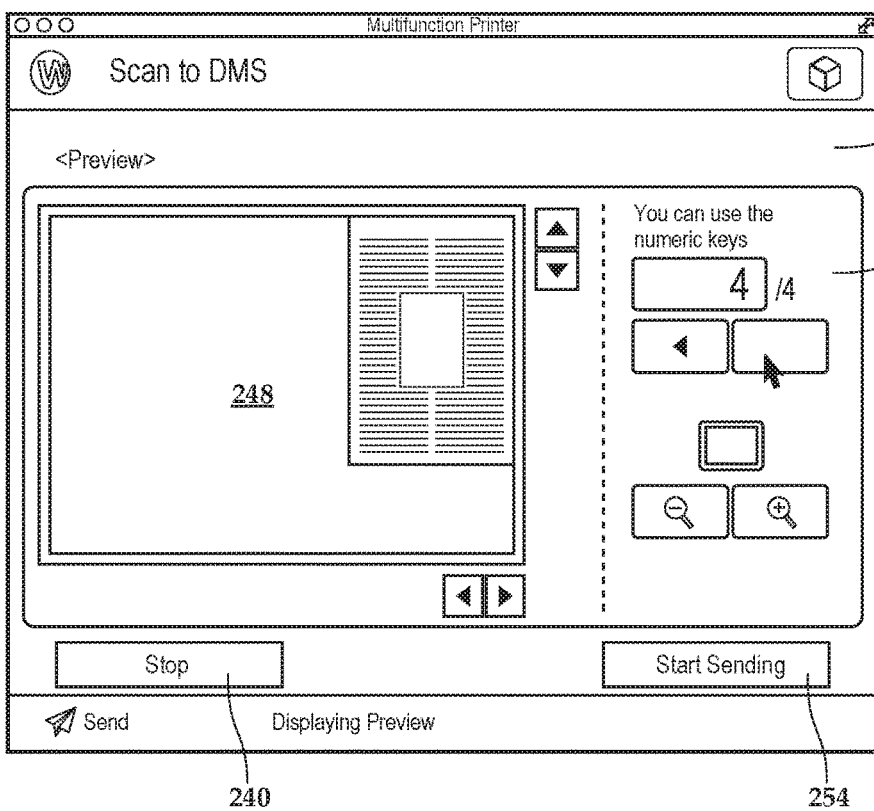
Figure 5G:
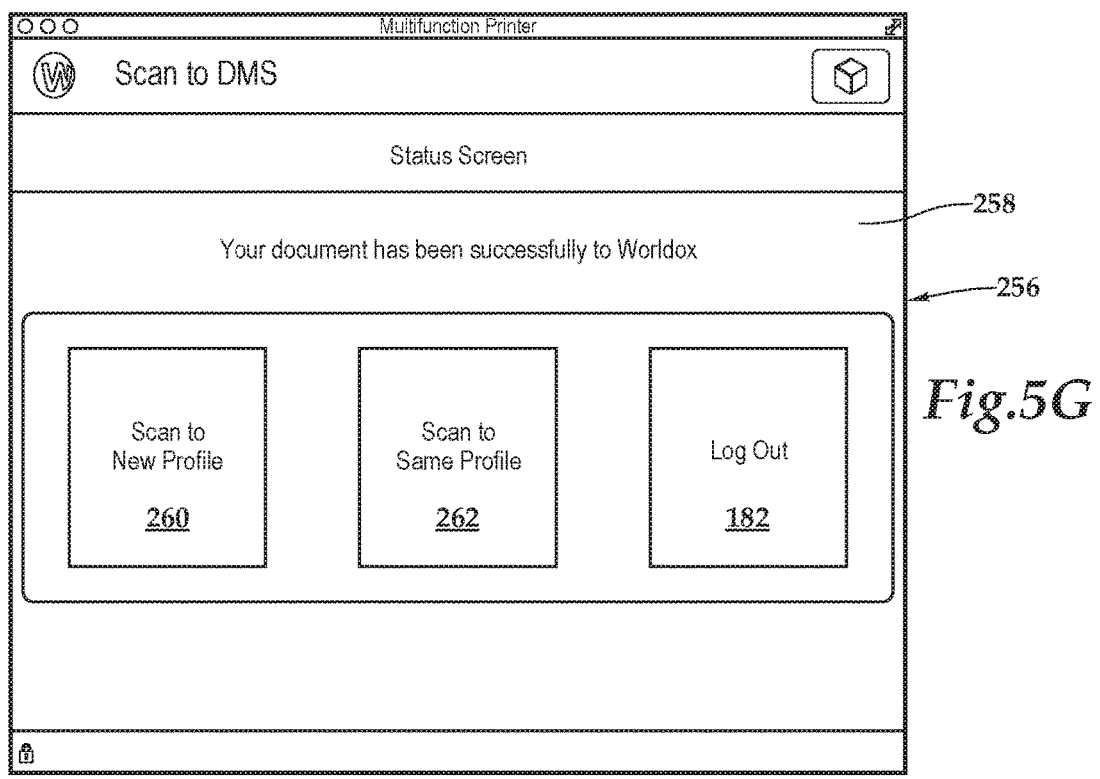

Referring now to FIG. 5D, an optional scan format screen 216 is displayed following the user selecting button 208 in FIG. 5C. In this screen, instructions 218 are provided as is various file types, including, for example, PDF at button 220, XPS at button 224, OOXML at button 226, and TFF at button 228. An expandable lateral window 230 expands upon the selections at the PDF button 220. The cancel button 212 and an "OK" button 232 are also present. Referring to FIG. 5E, a scanning window 234 is shown, following the pressing of the start scanning button in in FIG. 5C. Instructions 236 are included as is an enumeration of the number of pages being scanned at 238. A stop scanning button 240 and done button 242 are also present. Referring to FIG. 5F, an optional preview screen 244 is illustrated following the selection of the preview button 210 in FIG. 5C. In this screen, instructions 246 are provided, a preview 248 is provided and further scanning information 250 is provided. The stop scanning button 240 and a start sending button 254 are provided. Referring now to FIG. 5G, a scan complete screen 256 is shown wherein instructions 258 are provided and options, including a scan to a new profile button 260, a scan to same profile button 262, and a logout button 182. Once the job has been scanned and sent, in this screen, the user is presented options for the next steps, including starting a new job for a different matter (i.e., button 260), scanning another document to the same matter (i.e., button 262), or logging out (i.e., button 182). In this fashion, a scanning solution is presented for a paper intensive market that through the establishment and use of select metadata at the workflow multifunction document production device 30 or multifunction printer with scanning capability minimizes the user input—minimizes clicks—while still providing a wide selection of file formats.

The order of execution or performance of the methods and workflows illustrated and described herein is not essential, unless otherwise specified. That is, elements of the methods and workflows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for interactive visual representation of metadata within a networked heterogeneous workflow environment, the system comprising:
   a document management system (DMS) server including a plurality of files having a plurality of users;
   the document management system (DMS) server including a processor, memory, storage, inputs, and outputs;
   a busing architecture communicatively interconnecting the processor, the memory, the storage, the inputs, and the outputs;
   the inputs and the outputs including a communication link to a multifunction document production device having scanning capability and a graphical user interface;
   the inputs and the outputs including a communication link to a plurality of computing devices associated with the plurality of users; and
   the memory accessible to the processor, the memory including processor-executable instructions that, when executed, cause the processor to:
   evaluate the metadata associated with the plurality of files based on user and frequency characteristics,
   create, based on the evaluation, frequently-used metadata associated with each user,
   create for each user a multifunction document production device accessible interactive visual representation of the frequently-used metadata associated therewith, the multifunction document production device accessible interactive visual representation of the frequently-used metadata being visually presented in a profile type presentation on the graphical user interface of the multifunction document production device,
   receive a user login request originated by a user at the multifunction document production device,
   transmit the multifunction document production device accessible interactive visual representation of the frequently-used metadata associated with the user corresponding to the user login request,
   receive an electronic copy file with populated metadata, the populated metadata being a subset of the frequently-used metadata associated with the user login request, and
   store the electronic file copy at the document management server based on the metadata such that the electronic file copy is indexed and retrievable.

2. The system as recited in claim 1, wherein the multifunction document production device is a multifunction printer.

3. The system as recited in claim 1, wherein the multifunction document production device is a third-party device with respect to the document management server.

4. The system as recited in claim 1, wherein the computing device comprises a device selected from the group consisting of tablet computers, laptops, desktop computers, and smart phones.

5. The system as recited in claim 1, wherein the profile type presentation further comprises quick access containers.

6. The system as recited in claim 1, wherein the profile type presentation further comprises containers selected from the group consisting of favorite matters, quick profiles, workspaces, bookmarks, and profile groups.

7. The system as recited in claim 1, wherein the profile type presentation further comprises a favorite matters container including folders that have been most recently visited by the user.

8. The system as recited in claim 1, wherein the profile type presentation further comprises a quick profiles container including previous one click saves by the user.

9. The system as recited in claim 1, wherein the profile type presentation further comprises a workspace container including folders that are matter-centric to the user.

10. The system as recited in claim 1, wherein the profile type presentation further comprises a bookmarks container including matter locations saved by the user.

11. The system as recited in claim 1, wherein the profile type presentation further comprises a profile groups container including lists of all the profile groups that the user has permission to access.

12. The system as recited in claim 1, wherein the multifunction document production device accessible interactive visual representation is extensible to the multifunction document production device via a software protocol.

13. A system for interactive visual representation of metadata within a networked heterogeneous workflow environment, the system comprising:
   a document management system (DMS) server including a plurality of files having a plurality of users;
   the document management system (DMS) server including a processor, memory, storage, inputs, and outputs;
   a busing architecture communicatively interconnecting the processor, the memory, the storage, the inputs, and the outputs;
   the inputs and the outputs including a communication link to a multifunction document production device having scanning capability, printing capability, and a graphical user interface;
   the inputs and the outputs including a communication link to a plurality of computing devices associated with the plurality of users, the plurality of computing devices being selected from the group consisting of tablet computers, laptops, desktop computers, and smart phones; and
   the memory accessible to the processor, the memory including processor-executable instructions that, when executed, cause the processor to:
      evaluate the metadata associated with the plurality of files based on user and frequency characteristics,
      create, based on the evaluation, frequently-used metadata associated with each user,
      create for each user a multifunction document production device accessible interactive visual representation of the frequently-used metadata associated therewith, the multifunction document production device accessible interactive visual representation of the frequently-used metadata being visually presented in a profile type presentation on the graphical user interface of the multifunction document production device via an extensible software protocol, the profile type presentation including a plurality of quick access containers selected from the group consisting of favorite matters, quick profiles, workspaces, bookmarks, and profile groups,
      receive a user login request originated by a user at the multifunction document production device,
      transmit the multifunction document production device accessible interactive visual representation of the frequently-used metadata associated with the user corresponding to the user login request,
      receive an electronic copy file with populated metadata, the populated metadata being a subset of the frequently-used metadata associated with the user login request, and
      store the electronic file copy at the document management server based on the metadata such that the electronic file copy is indexed and retrievable.

14. The system as recited in claim 13, wherein the profile type presentation further comprises a favorite matters container including folders that have been most recently visited by the user.

15. The system as recited in claim 13, wherein the profile type presentation further comprises a quick profiles container including previous one click saves by the user.

16. The system as recited in claim 13, wherein the profile type presentation further comprises a workspace container including folders that are matter-centric to the user.

17. The system as recited in claim 13, wherein the profile type presentation further comprises a bookmarks container including matter locations saved by the user.

18. The system as recited in claim 13, wherein the profile type presentation further comprises a profile groups container including lists of all the profile groups that the user has permission to access.

19. A system for interactive visual representation of metadata within a networked heterogeneous workflow environment, the system comprising:
   a document management system server including a plurality of files having a plurality of users;
   the document management system (DMS) server including a processor, memory, storage, inputs, and outputs;
   a busing architecture communicatively interconnecting the processor, the memory, the storage, the inputs, and the outputs;
   the inputs and the outputs including a communication link to a multifunction document production device having scanning capability, printing capability, and a graphical user interface;
   the inputs and the outputs including a communication link to a plurality of computing devices associated with the plurality of users, the plurality of computing devices being selected from the group consisting of tablet computers, laptops, desktop computers, and smart phones;
   with respect to the document management server, the memory accessible to the processor, the memory including processor-executable instructions that, when executed, cause the processor to:
      evaluate the metadata associated with the plurality of files based on user and frequency characteristics,
      create, based on the evaluation, frequently-used metadata associated with each user,
      create for each user a multifunction document production device accessible interactive visual representation of the frequently-used metadata associated therewith, the multifunction document production device accessible interactive visual representation of the frequently-used metadata being visually presented in a profile type presentation on the graphical user interface of the multifunction document production device via an extensible software protocol,
      receive a user login request originated by a user at the multifunction document production device,
      transmit the multifunction document production device accessible interactive visual representation of the frequently-used metadata associated with the user corresponding to the user login request,
      receive an electronic copy file with populated metadata, the populated metadata being a subset of the frequently-used metadata associated with the user login request, and store the electronic file copy at the document management server based on the metadata such that the electronic file copy is indexed and retrievable;

the multifunction document production device including a processor, memory, storage, scanner, printer, display, inputs, and outputs;

a busing architecture communicatively interconnecting the processor, the memory, the storage, the printer, the scanner, the display, the inputs, and the outputs, the inputs and the outputs sharing the communication link with the document management server; and with respect to the multifunction document production device, the memory accessible to the processor, the memory including processor-executable instructions that, when executed, cause the processor to:

prompt login information at the graphical user interface, receive login information at the graphical user interface, transmit user login information to the multifunction document production device, receive the multifunction document production device accessible interactive visual representation from the multifunction document production device, prompt user selection within the profile type presentation at the graphical user interface, receive the user selection within the profile type presentation at the graphical user interface, scan a hard copy file, create a new electronic copy file based on the hard copy file, populate the new electronic copy file with metadata corresponding to the user selection, and transmit the electronic copy file with populated metadata to the multifunction document production device.

20. The system as recited in claim 19, wherein the multifunction document production device is a multifunction printer.

* * * * *